(12) United States Patent
Dagley et al.

(10) Patent No.: US 10,643,364 B1
(45) Date of Patent: May 5, 2020

(54) GROUND PLANE DETECTION FOR PLACEMENT OF AUGMENTED REALITY OBJECTS

(71) Applicant: Capital One Services, LLC, McLean, VA (US)

(72) Inventors: Geoffrey Dagley, McKinney, TX (US); Jason Hoover, Grapevine, TX (US); Qiaochu Tang, The Colony, TX (US); Stephen Wylie, Carrollton, TX (US); Sunil Vasisht, Flower Mound, TX (US); Micah Price, Anna, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/742,054

(22) Filed: Jan. 14, 2020

Related U.S. Application Data

(63) Continuation of application No. 16/011,030, filed on Jun. 18, 2018, now Pat. No. 10,540,796, which is a continuation of application No. 15/850,234, filed on Dec. 21, 2017, now Pat. No. 10,026,209.

(51) Int. Cl.
*G06T 11/60* (2006.01)
*G06T 11/00* (2006.01)
*G06T 7/62* (2017.01)
*G06T 7/73* (2017.01)

(52) U.S. Cl.
CPC .............. *G06T 11/60* (2013.01); *G06T 7/62* (2017.01); *G06T 7/73* (2017.01); *G06T 11/00* (2013.01); *G06T 2207/30204* (2013.01); *G06T 2210/12* (2013.01)

(58) Field of Classification Search
None
See application file for complete search history.

(56) References Cited

U.S. PATENT DOCUMENTS

| 5,528,735 | A | 6/1996 | Strasnick et al. |
| 6,522,312 | B2 | 2/2003 | Ohshima et al. |
| 6,714,663 | B1 * | 3/2004 | Bornowski ............. G06T 17/00 382/106 |
| 7,775,883 | B2 | 8/2010 | Smoot et al. |
| 9,886,035 | B1 * | 2/2018 | Watts ................... G05D 1/0251 |

(Continued)

OTHER PUBLICATIONS

Apple Developer, "Building Your First AR Experience," 2017, 3 pages. Retrieved from Internet:[URL:https://developer.apple.com/documentation/arkit/building_your_first_ar_experience].

(Continued)

*Primary Examiner* — James A Thompson
(74) *Attorney, Agent, or Firm* — Harrity & Harrity, LLP

(57) ABSTRACT

In some implementations, a system may include a camera, a display, one or more memories, and one or more processors communicatively coupled to the one or more memories. The system may identify a horizontal plane in an image being captured by the camera and presented on the display, may determine a size of the horizontal plane, and may determine that the size of the horizontal plane satisfies a threshold. The system may designate the horizontal plane as a ground plane based on determining that the size of the horizontal plane satisfies the threshold. The system may output an indication that the horizontal plane has been designated as the ground plane.

20 Claims, 8 Drawing Sheets

(56) References Cited

U.S. PATENT DOCUMENTS

| | | |
|---|---|---|
| 10,026,209 B1 | 7/2018 | Dagley et al. |
| 10,540,796 B2 | 1/2020 | Dagley et al. |
| 2003/0117398 A1 | 6/2003 | Hubrecht et al. |
| 2011/0298824 A1 | 12/2011 | Lee et al. |
| 2011/0317880 A1 | 12/2011 | Pettersson et al. |
| 2014/0169627 A1* | 6/2014 | Gupta ................ B60R 1/00 382/103 |
| 2014/0225919 A1 | 8/2014 | Kaino et al. |
| 2015/0036887 A1* | 2/2015 | Allezard ............ G06T 7/50 382/106 |
| 2015/0062120 A1 | 3/2015 | Reisner-Kollmann et al. |
| 2015/0097865 A1 | 4/2015 | Subramanian et al. |
| 2016/0055268 A1* | 2/2016 | Bell .................. G06F 30/13 703/1 |
| 2016/0196659 A1 | 7/2016 | Vrcelj et al. |
| 2017/0032676 A1 | 2/2017 | Mesmakhosroshahi et al. |
| 2017/0329480 A1 | 11/2017 | Ishikawa et al. |
| 2018/0113506 A1 | 4/2018 | Hall et al. |
| 2019/0065933 A1* | 2/2019 | Bogdoll ............. G08G 1/16 |
| 2019/0096135 A1* | 3/2019 | Dal Mutto .......... G06T 7/0006 |
| 2019/0102602 A1* | 4/2019 | Uchida .............. G08G 1/04 |
| 2019/0197750 A1 | 6/2019 | Dagley et al. |
| 2020/0051281 A1* | 2/2020 | Singh ................ B60R 1/00 |

OTHER PUBLICATIONS

Dawson M., "ARKit by Example—Part2:Plane Detection + Visualization," Jun. 11, 2017, 12 pages. Retrieved from Internet:[URL:https://blog.markdaws.net/arkit-by-example-part-2-plane-detection-visualization-10f05876d53].

Human Interface Guidelines., "Augmented Reality," 2017, 9 pages. Retrieved from Internet;[URL:http://developer.apple.com/ios/human-interface-guidelines/technologies/augmented-reality/#placing-virtual-objects].

Tango., "Unity How-to Guide: Placing Virtual Objects in Augmented Reality," May 10, 2017, 5 pages. Retrieved from Internet:[URL:https://developers.google.com/tango/apls/unity-howto-placing-objects].

* cited by examiner

US 10,643,364 B1

GROUND PLANE DETECTION FOR PLACEMENT OF AUGMENTED REALITY OBJECTS

RELATED APPLICATIONS

This application is a continuation of U.S. patent application Ser. No. 16/011,030, filed Jun. 18, 2018 (now U.S. Pat. No. 10,540,796), which is a continuation of U.S. patent application Ser. No. 15/850,234, filed Dec. 21, 2017 (now U.S. Pat. No. 10,026,209), which are incorporated herein by reference.

BACKGROUND

Augmented reality (AR) may refer to a live view of a physical, real-world environment that is modified by a computing device to enhance an individual's current perception of reality. In augmented reality, elements of the real-world environment are "augmented" by computer-generated or extracted input, such as sound, video, graphics, haptics, global positioning system (GPS) data, and/or the like. Augmented reality may be used to enhance and/or enrich the individual's experience with the real-world environment.

SUMMARY

According to some possible implementations, a system may include a camera, a display, one or more memories, and one or more processors communicatively coupled to the one or more memories. The system may identify a horizontal plane in an image being captured by the camera and presented on the display, may determine a size of the horizontal plane, and may determine that the size of the horizontal plane satisfies a threshold. The system may designate the horizontal plane as a ground plane based on determining that the size of the horizontal plane satisfies the threshold. The system may output an indication that the horizontal plane has been designated as the ground plane.

According to some possible implementations, a method may include identifying, by a device, a horizontal plane in an image being captured by the device and presented on a display of the device. The method may include determining, by the device, a size of the horizontal plane, and determining, by the device, that the size of the horizontal plane satisfies a threshold. The method may include designating, by the device, the horizontal plane as a ground plane based on determining that the size of the horizontal plane satisfies the threshold. The method may include superimposing, by the device, a representation of an augmented reality object on the image relative to the horizontal plane designated as the ground plane.

According to some possible implementations, a non-transitory computer-readable medium may store one or more instructions. The one or more instructions, when executed by one or more processors of a device, may cause the one or more processors to identify a horizontal plane in an image being captured by the device and presented on a display of the device. The one or more instructions may cause the one or more processors to determine a size of the horizontal plane, determine that the size of the horizontal plane satisfies a threshold, and designate the horizontal plane as a ground plane based on determining that the size of the horizontal plane satisfies the threshold. The one or more instructions may cause the one or more processors to output an indication that the horizontal plane has been designated as the ground plane.

DETAILED DESCRIPTION

The following detailed description of example implementations refers to the accompanying drawings. The same reference numbers in different drawings may identify the same or similar elements.

Augmented reality may be used to superimpose virtual objects (sometimes referred to as augmented reality objects herein) on a display of an image of an environment that is being captured (e.g., in real time). For example, a user of a user device (e.g., a smartphone, a tablet, smart glasses, and/or the like) may use a camera of the user device to capture video of the user's surroundings, and the user device (e.g., an augmented reality application running on the user device) may superimpose a representation of an object (e.g., an augmented reality object) on the image being captured by the user device. In order to place the augmented reality object on the display, the user device may need to correctly determine a location of the ground of the environment. Some tools may identify horizontal planes that occur within an environment, but may not be capable of identifying a ground plane. Such tools do not permit automatic placement of augment reality objects relative to a ground plane (e.g., at a particular height above the ground).

Some implementations described herein permit a user device to identify and/or designate a ground plane, which can be used for the placement of augmented reality objects. For example, the user device may identify a horizontal plane in an image being captured by the user device, may determine a size of the horizontal plane, and may determine that the size of the horizontal plane satisfies a threshold. Based on determining that the size of the horizontal plane satisfies the threshold, the user device may designate the horizontal plane as a ground plane, may output an indication that the horizontal plane has been designated as a ground plane, and may superimpose a representation of an augmented reality object on the image relative to the horizontal plane designated as the ground plane.

In this way, implementations described herein provide for effective and accurate placement of augmented reality objects in an image displayed by a user device, such as automatic placement of augmented reality objects at a particular height above the ground. Furthermore, by automatically identifying and/or designating the ground plane upon satisfaction of the threshold, implementations described herein obviate further horizontal plane detection operations, thus conserving processing resources, power (e.g., battery life), and/or the like.

FIGS. 1A-1E are diagrams of an overview of an example implementation 100 described herein. As shown in FIGS. 1A-1E, example implementation 100 may include a user device (e.g., a smart phone running an augmented reality application) which may capture an image (e.g., of the real world environment of the user device) on which the user device may superimpose an augmented reality object.

Figure 1A:
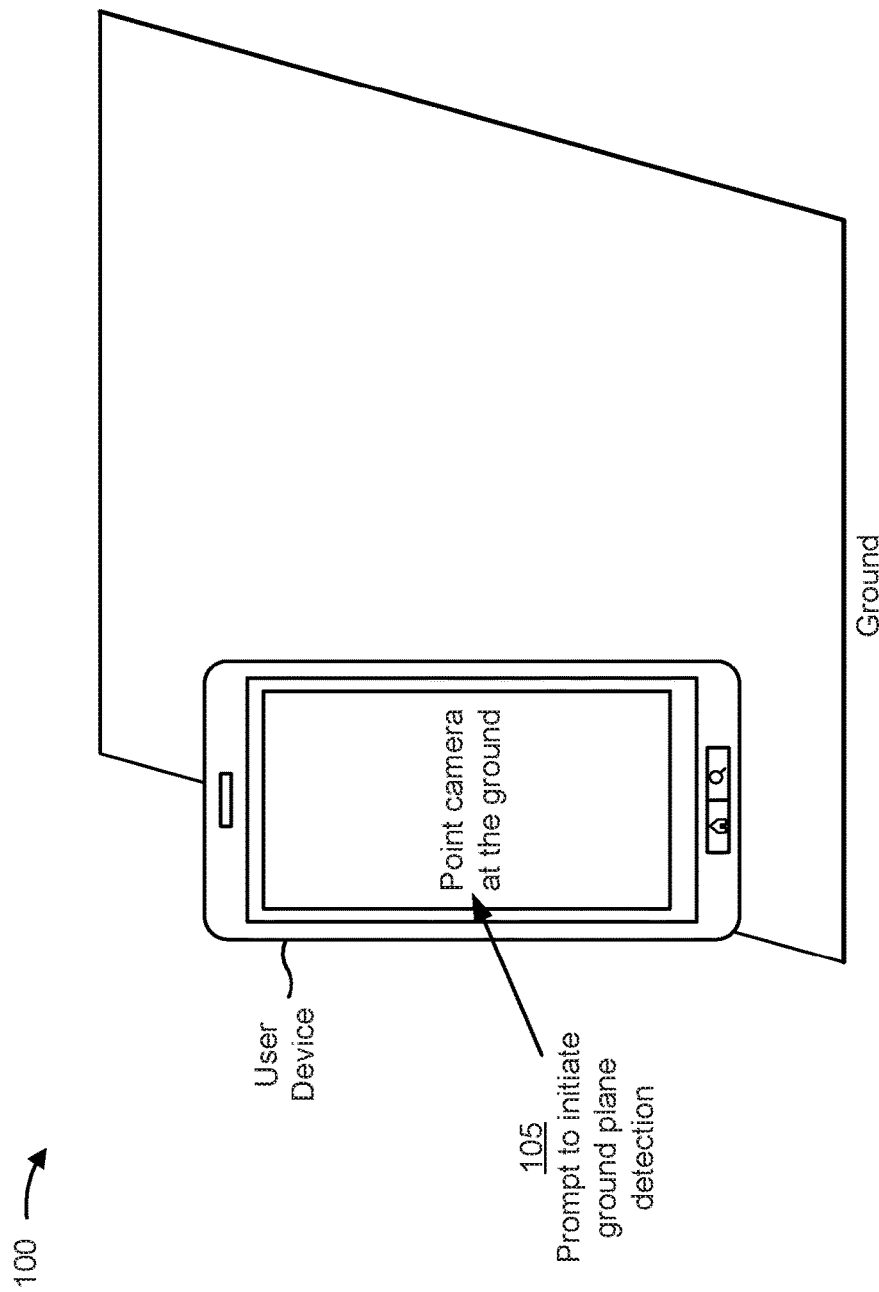
FIGS. 1A-1E are diagrams of an overview of an example implementation described herein.

As shown in FIG. 1A, and by reference number 105, the user device may prompt the user to point a camera of the user device at the ground within a real world environment of the user device. The user may point the camera to capture the ground on at least a portion of the display of the user device.

Figure 1B:
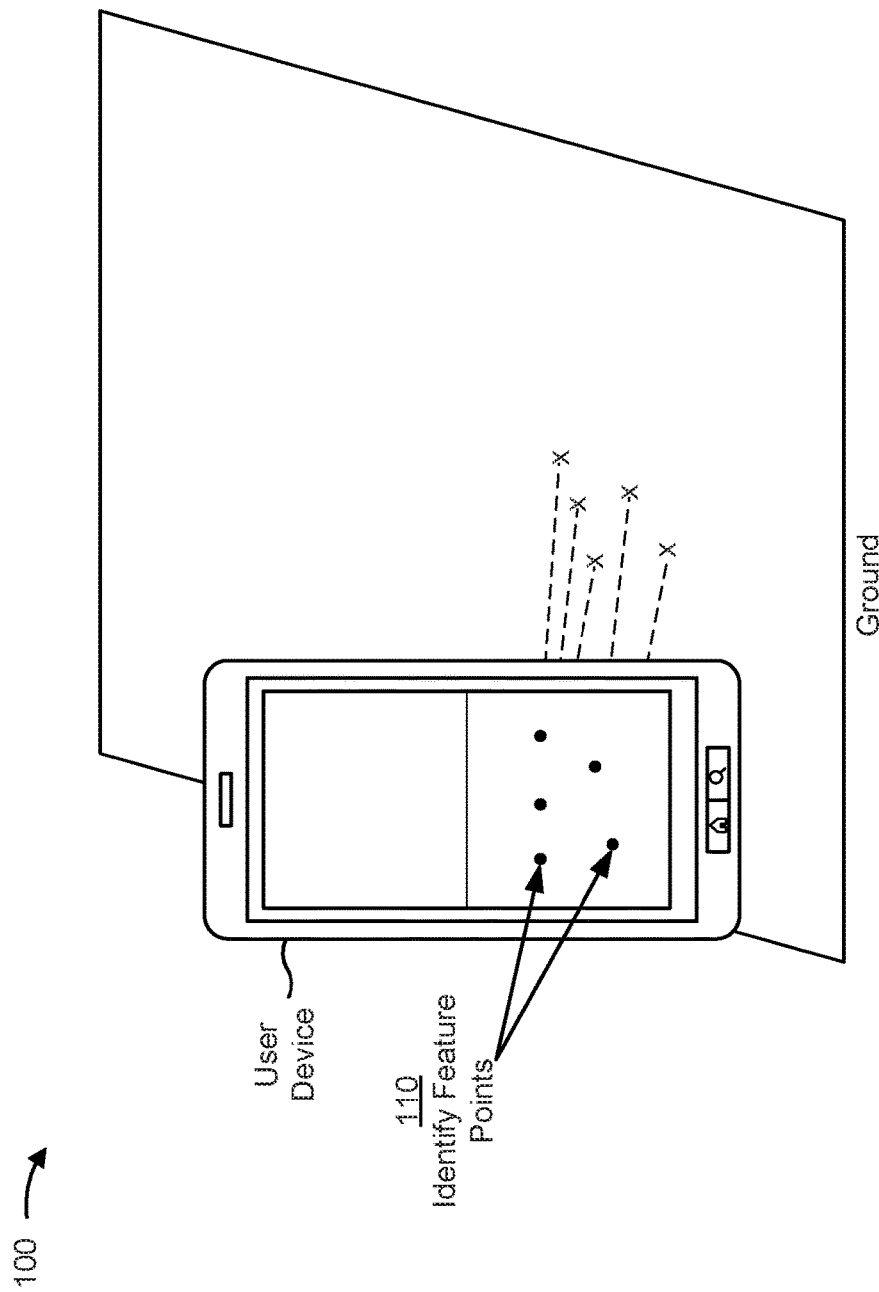

As shown in FIG. 1B, and by reference number 110, the user device may identify feature points within the real world environment (e.g., captured by a camera of the smart phone) that may be used to identify a horizontal plane within the real world environment of the user. A feature point may be any point capable of being distinguished from surrounding areas using computer vision techniques, such as an area of different color, a scratch, a marking, a rough surface, and/or the like.

Figure 1C:
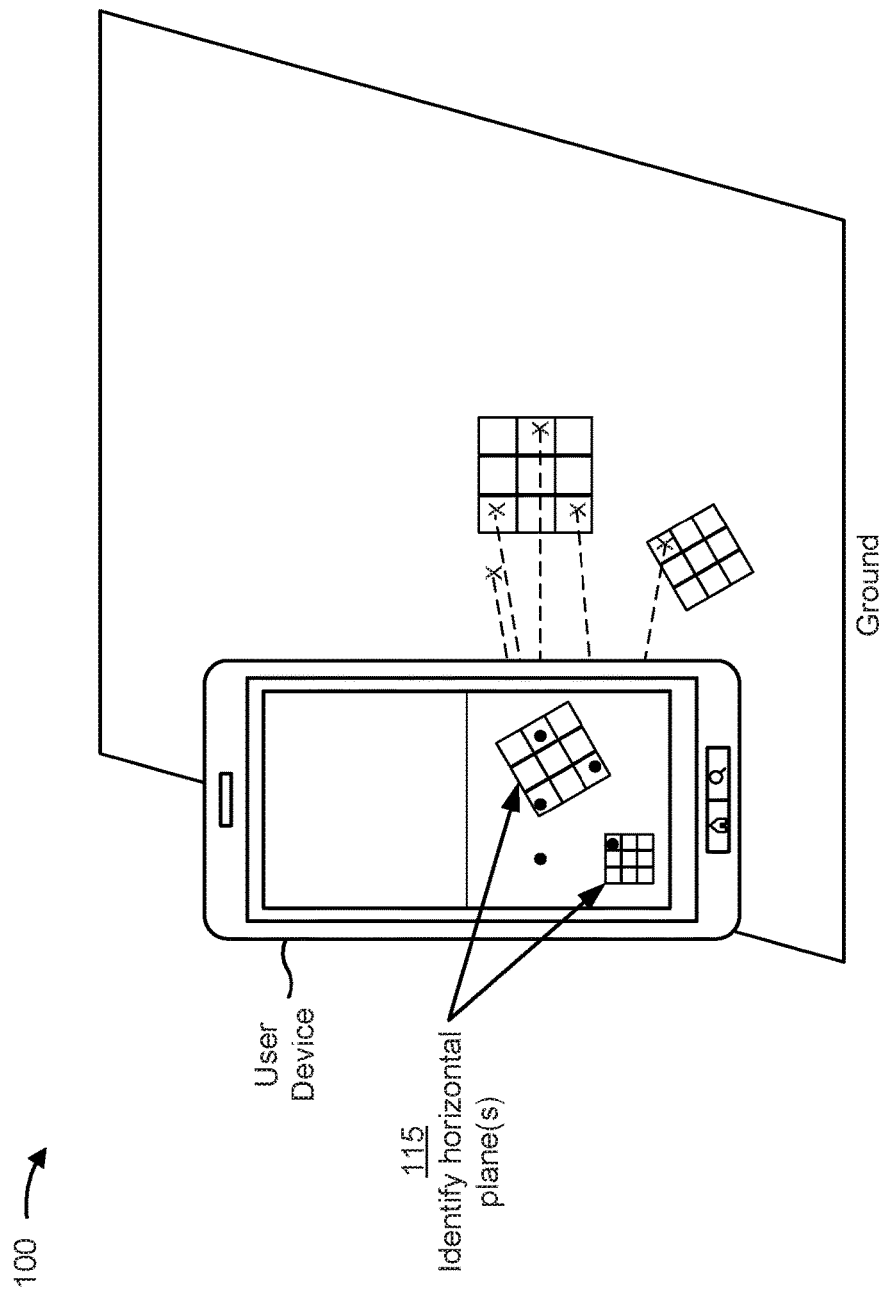

As shown in FIG. 1C, and by reference number 115, the user device may identify one or more horizontal planes in an image being captured and/or displayed by the user device (e.g., captured by a camera of a smart phone running the augmented reality application and presented on a display of the smart phone). For example, the user device (e.g., the smart phone running the augmented reality application) may identify the horizontal planes based on the feature points identified by the user device.

Figure 1D:
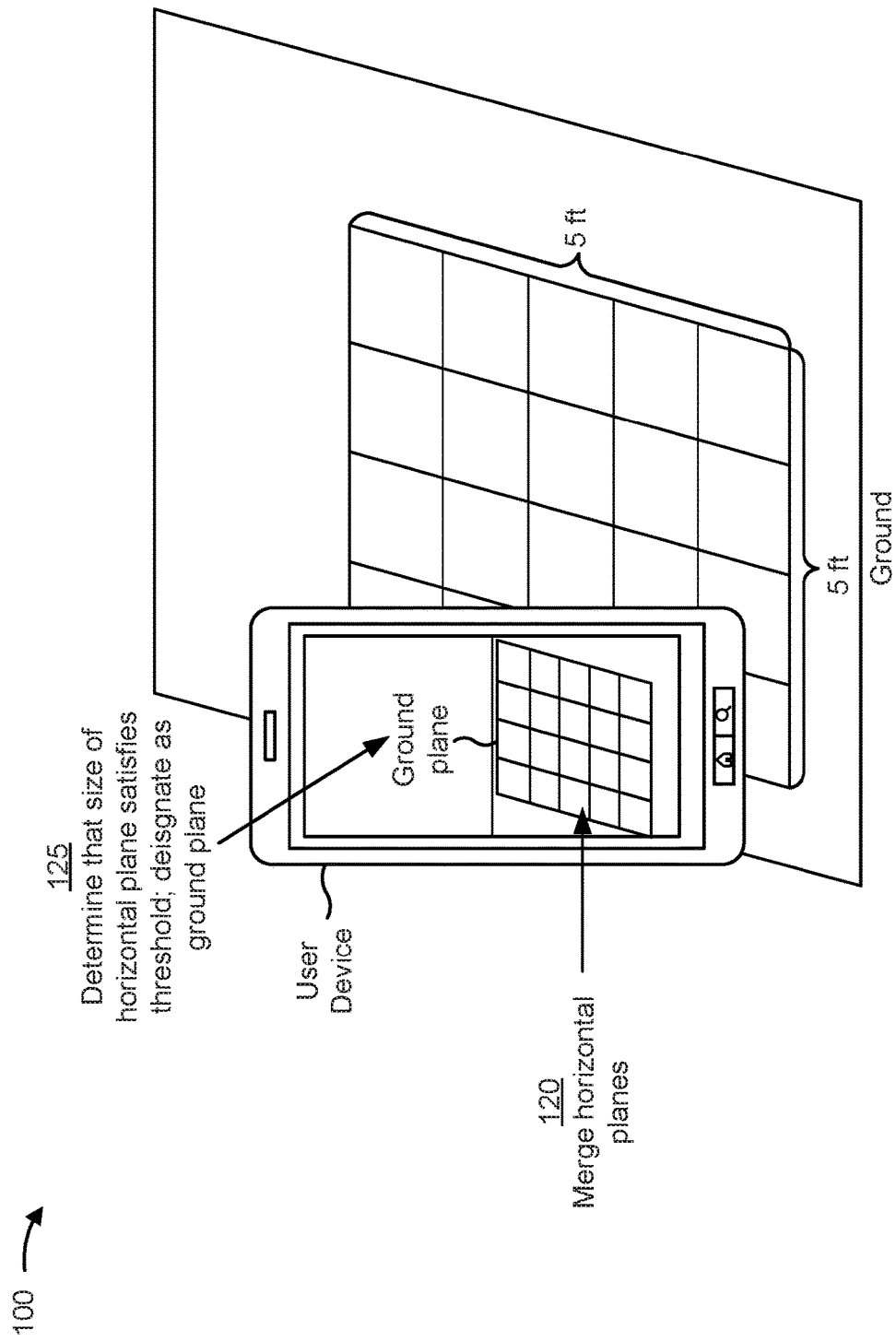

As shown in FIG. 1D, and by reference number 120, the user device may merge horizontal planes to form larger horizontal planes, and may determine whether a size of a horizontal plane (e.g., a merged or unmerged horizontal plane) satisfies a threshold. For example, the user device may compare identified horizontal planes to determine that the horizontal planes are aligned, and may merge the horizontal planes to form a larger horizontal plane (e.g., a merged plane). In this case, the user device may continue to merge the horizontal planes and compare a size of the merged horizontal plane to a threshold until a resulting merged plane has a size that satisfies a threshold. As shown by reference number 125, upon determining that the size of a horizontal plane (e.g., a merged horizontal plane) satisfies a threshold, the user device may designate the horizontal plane as a ground plane.

In some implementations, the user device may eliminate a first horizontal plane from consideration as a ground plane if a second horizontal plane, located below the first horizontal plane (e.g., at a lower height, elevation, and/or the like) has been identified. In this way, processing resources may be conserved by eliminating a horizontal plane from consideration as a ground plane. Additionally, or alternatively, the user device may detect multiple horizontal planes, and may designate the lowest detected horizontal plane (e.g., the horizontal plane with the lowest elevation, height, and/or the like) as the ground plane.

Additionally, or alternatively, the user device may estimate a vertical distance between the user device (e.g., a camera of the user device) and a horizontal plane identified in the image, and may use the vertical distance to designate a horizontal plane as a ground plane. For example, the user device may eliminate a horizontal plane from consideration as a ground plane if the horizontal plane is less than a threshold vertical distance from the camera (e.g., 3 feet, 1 meter, and/or the like). In some implementations, the threshold may be configurable based on detection of whether a user of the user device is standing (e.g., a higher threshold), sitting (e.g., a lower threshold), and/or the like. In some implementations, the user device may detect whether a user is standing, sitting, and/or the like based on movement of the user device (e.g., a speed or velocity), based on an acceleration of the user device, based on gait detection, and/or the like.

In some implementations, the user device may extend the horizontal plane, designated as the ground plane, in one or more directions based on determining that the size of the horizontal plane satisfies the threshold. For example, the user device may extend the ground plane in all directions, which may eliminate the need to perform further horizontal plane and/or ground plane detection. Additionally, or alternatively, the user device may prevent additional horizontal plane detection and/or merging based on determining that the size of the horizontal plane satisfies the threshold and/or based on designating a horizontal plane as a ground plane, thereby conserving resources of the user device (e.g., processing resources, memory resources, battery power, and/or the like).

In some implementations, the user device may determine that the size of the horizontal plane satisfies a threshold by determining that a dimension (e.g., length, width, etc.) of the horizontal plane satisfies a threshold (e.g., 4 feet, 5 feet, 6 feet, 2 meters, 3 meters, etc.). In some implementations, the user device may determine that the size of the horizontal plane satisfies a threshold by determining that multiple dimensions of the horizontal plane satisfy a threshold (e.g., a first dimension satisfies a first threshold and a second dimension satisfies a second threshold, which may be the same or different from the first threshold). In some implementations, the user device may determine that the size of the horizontal plane satisfies a threshold by determining that an area of the horizontal plane satisfies a threshold (e.g., 25 square feet, 9 square meters, etc.).

In some implementations, the threshold may be user configurable. For example, the user device may provide a user interface via which a user can select, adjust, reset, configure, and/or reconfigure the threshold. For example, the user device may apply a threshold that requires at least one dimension to be 5 feet, and the user may adjust the threshold to require at least one dimension to be 10 feet, or to require both dimensions to be 5 feet, or the like. In some implementations, the user device may set the threshold based on a size of an augmented reality object to be placed in the image of the real world environment of the user. For example, for a larger augmented reality object, the user device may set the threshold to require the horizontal plane to have a larger area for placement of the larger augmented reality object. Conversely, for a smaller augmented reality object, the user device may set the threshold to require the horizontal plane to have a smaller area for placement of the smaller augmented reality object.

In some implementations, the user device may designate the horizontal plane as a ground plane by storing, in a memory of the user device, an indication that the horizontal plane is a ground plane. Thereafter, the user device may use the stored indication, such as to output the augmented reality object on a display of the user device, and/or to output the indication on a display of the user device.

Figure 1E:
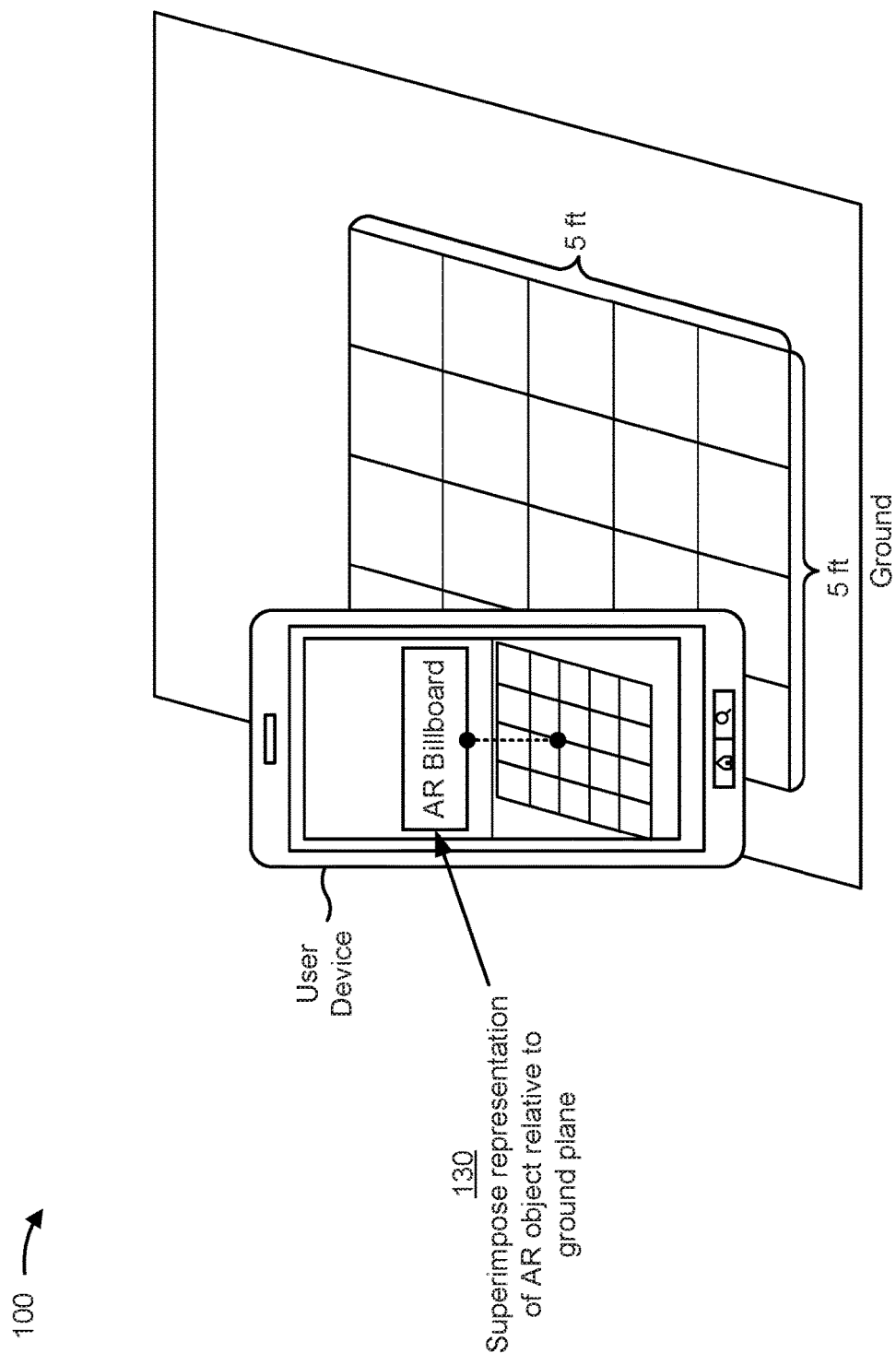

As shown in FIG. 1E, and by reference number 130, the user device may superimpose a representation of an augmented reality object on an image relative to the ground plane. For example, the user device may superimpose the representation on the image using the ground plane as a reference point (e.g., to display the augmented reality object at a particular height above the ground plane).

As one example, the user device may superimpose a representation of an augmented reality object on an image in order to provide information about a car. In this case, a user may point the user device (e.g., point a camera of a smart phone) at the car, and the user device may use object recognition to identify the car (e.g., the make, model, and/or the like) and to obtain information about the car (e.g., by accessing a server, a network, the Internet, and/or the like). The user device may then present an augmented reality object (e.g., an augmented reality billboard) that provides the information about the car (e.g., make, model, price, and/or the like) on the display of the user device, such as by placing the augment reality object to appear above the car.

As other examples, the user device may superimpose a representation of an augmented reality object on an image in order to provide information about other vehicles, other objects, and/or the like. For example, the user device may superimpose a representation of an augmented reality object on an image in order to provide information about a house. In this case, a user may point the user device (e.g., point a camera of a smart phone) at the house, and the user device may use location (e.g., GPS coordinates), object recognition, optical character recognition (e.g., of an address number), etc. to identify the house, and may obtain information (e.g., multiple listing service (MLS)) information) about the house (e.g., by accessing a server, a network, a database, etc.). The user device may then present an augmented reality object (e.g., an augmented reality billboard) on the display of the user device, such as by placing the augmented reality object to appear above the house, that provides the information (e.g., price, size, number of bathrooms, number of bedrooms, tax information, etc.) about the house.

In this way, the user device provides for effective and accurate placement of augmented reality objects in an image displayed by a user device (e.g., a smart phone). Furthermore, by automatically designating and/or identifying the ground plane upon satisfaction of the threshold, the user device obviates further horizontal plane detection operations, thus conserving processing resources, power (e.g., battery life), and/or the like of the user device.

As indicated above, FIGS. 1A-1E are provided merely as examples. Other examples are possible and may differ from what was described with regard to FIGS. 1A-1E.

Figure 2:
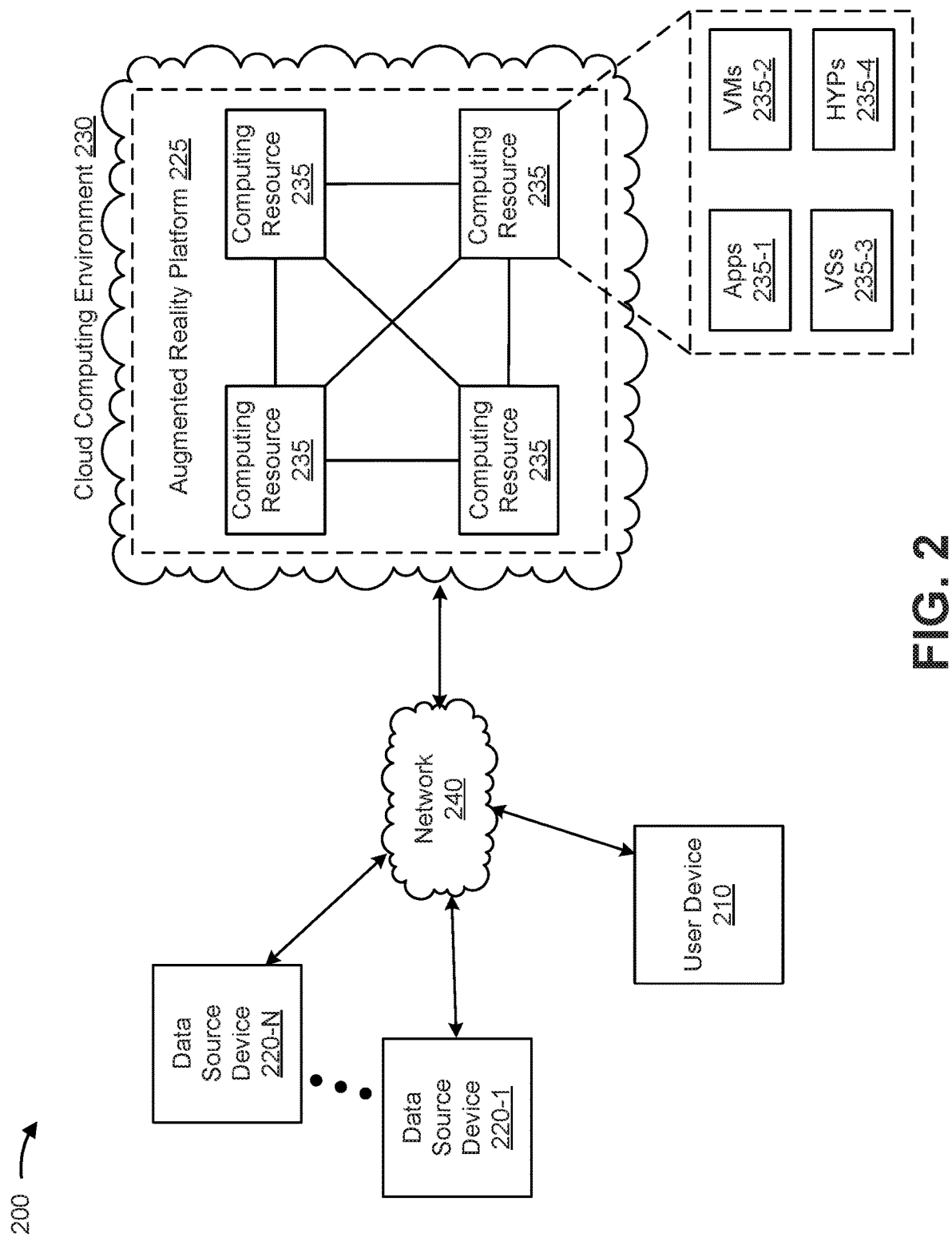
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more data source devices 220-1 through 220-N (which may be referred to individually as "data source device 220" and collectively as "data source devices 220"), an augmented reality platform 225, a cloud computing environment 230 (which may include one or more computing resources 235), and a network 240. Devices of environment 200 may interconnect via wired connections, wireless connections, or a combination of wired and wireless connections.

User device 210 includes one or more devices capable of receiving, generating, storing, processing, and/or providing information associated with detecting horizontal planes in an image and/or presenting augmented reality objects. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device. In some implementations, user device 210 may include an image capture component, such as a camera, a camcorder, and/or the like. Additionally, or alternatively, user device 210 may include a display.

Data source device 220 includes one or more devices capable of storing, processing, and/or routing information associated with providing an augmented reality experience. In some implementations, data source device 220 may include a server or another type of communication and/or computing device. In some implementations, data source device 220 may store information that is accessible to user device 210, and that may be used to provide an augmented reality experience on user device 210. For example, user device 210 may access information stored by data source device 220, and data source 220 may provide such information to user device 210, such that user device 210 may present such information in association with an augmented reality object presented for display by user device 210.

Augmented reality platform 225 includes one or more devices (e.g., computing resources 235) capable of providing an augmented reality experience, according to some implementations described herein.

Cloud computing environment 230 includes an environment that delivers computing as a service, whereby shared resources, services, and/or the like may be provided to user device 210. Cloud computing environment 230 may provide computation, software, data access, storage, and/or other services that do not require end-user knowledge of a physical location and configuration of a system and/or a device that delivers the services. As shown, cloud computing environment 230 may include a group of computing resources 235 (which may be referred to herein individually as computing resource 235).

Notably, while implementations described herein describe augmented reality platform 225 as being hosted in cloud computing environment 230, in some implementations, augmented reality platform 225 may not be cloud-based (i.e., may be implemented outside of a cloud computing environment) or may be partially cloud-based.

Computing resource 235 includes one or more personal computers, workstation computers, server devices, or another type of computation and/or communication device. In some implementations, computing resource 235 may host augmented reality platform 225. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with augmented reality platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
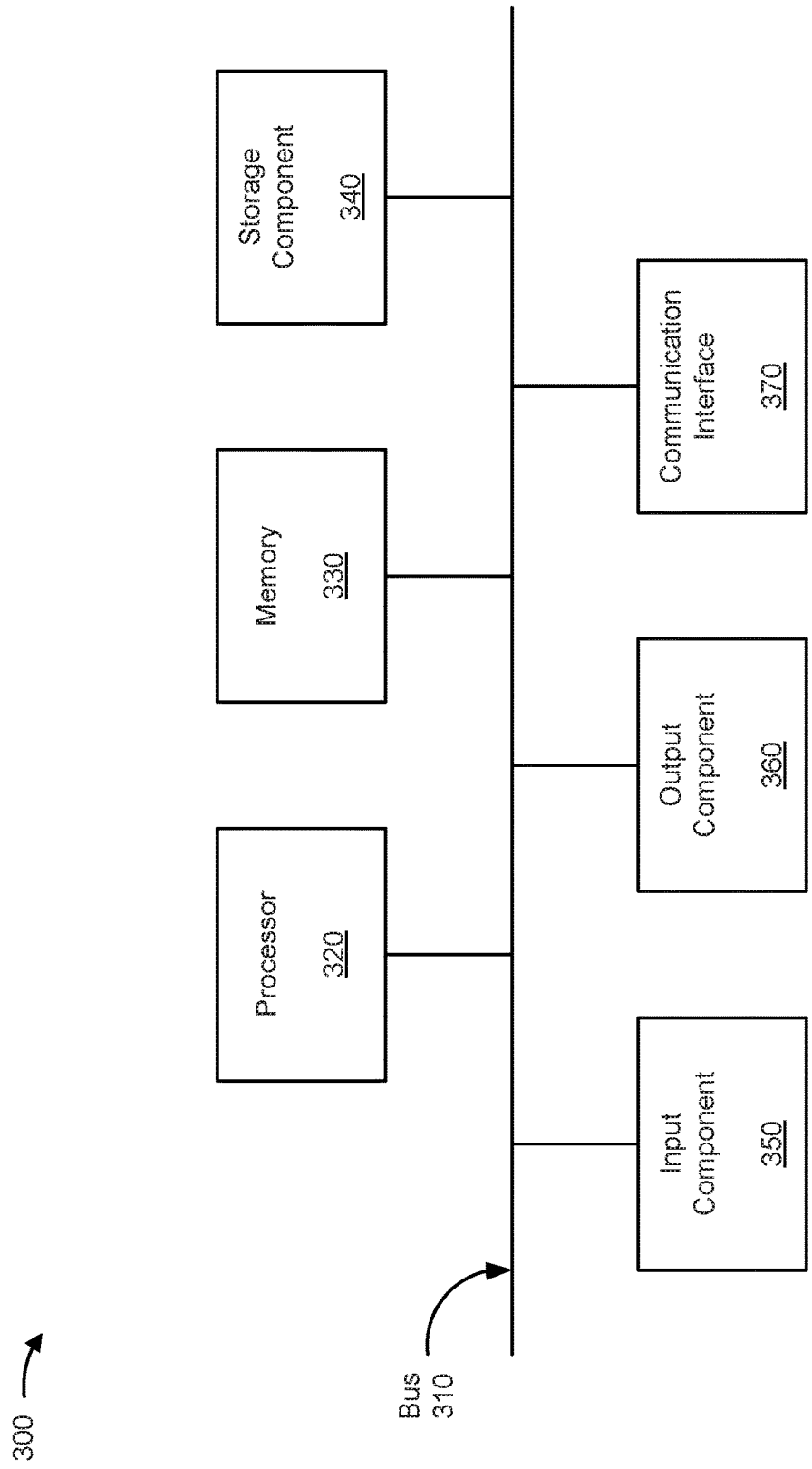
FIG. 3 is a diagram of example components of one or more devices of FIG. 2.

FIG. 3 is a diagram of example components of a device 300. Device 300 may correspond to user device 210, data source device 220, computing resource 235, and/or the like. In some implementations, user device 210, data source device 220, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include an image capture device, such as a camera and/or the like. Additionally, or alternatively, input component 350 may include a sensor for sensing information (e.g., a camera, a global positioning system (GPS) component, an accelerometer, a gyroscope, and/or an actuator). Output component 360 includes a component that provides output information from device 300 (e.g., a display, a speaker, and/or one or more light-emitting diodes (LEDs)). For example, output component 360 may include a light-emitting diode (LED) display, an organic LED (OLED) display, and/or the like.

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
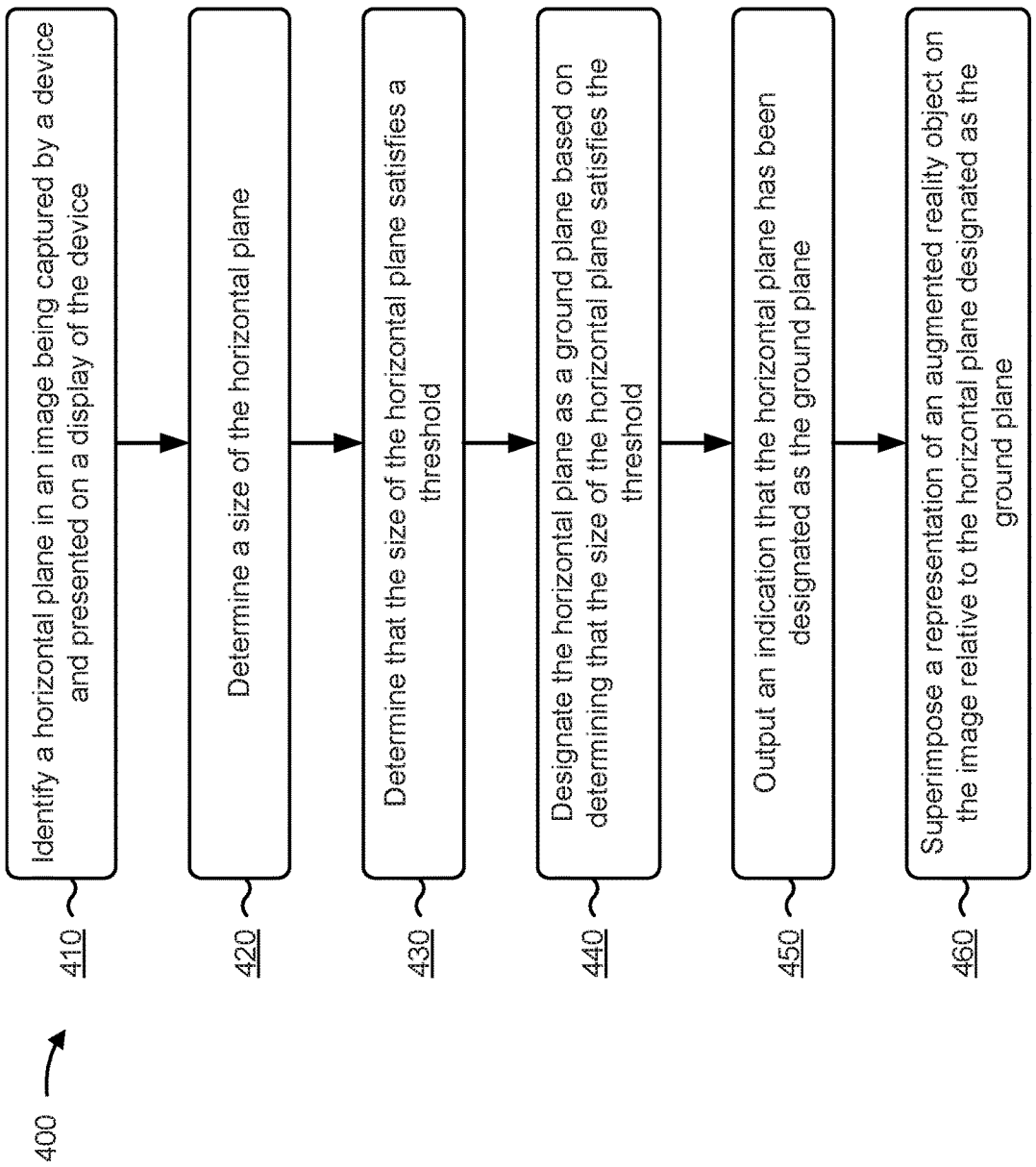
FIG. 4 is a flow chart of an example process for ground plane detection for placement of augmented reality objects.

FIG. 4 is a flow chart of an example process 400 for ground plane detection for placement of augmented reality objects. In some implementations, one or more process blocks of FIG. 4 may be performed by user device 210. In some implementations, one or more process blocks of FIG. 4 may be performed by another device or a group of devices separate from or including user device 210, such as data source device 220, augmented reality platform 225, cloud computing environment 230, computing resource 235, and/or the like.

As shown in FIG. 4, process 400 may include identifying a horizontal plane in an image being captured by a device and presented on a display of the device (block 410). For example, user device 210 may identify (e.g., using processor 320 and/or the like) a horizontal plane in an image being captured by a device and presented on a display of the device, as described above in connection with FIGS. 1A-1E.

In some implementations, user device 210 may identify the horizontal plane in an image captured by a camera. For example, the user device 210 may include a smart phone, and may identify the horizontal plane in an image captured by a camera of the smart phone. In some implementations, user device 210 may detect multiple horizontal planes, and may merge the multiple detected horizontal planes to form the horizontal plane. In this way, user device 210 may identify a horizontal plane in an image being captured by a device and presented on a display of the device, which may enable user device 210 to determine a size of the horizontal plane, as described herein.

As further shown in FIG. 4, process 400 may include determining a size of the horizontal plane (block 420). For example, user device 210 may determine (e.g., using processor 320 and/or the like) a size of the horizontal plane, as described above in connection with FIGS. 1A-1E.

In some implementations, user device 210 may determine a size of the horizontal plane by determining a dimension (e.g., length, width, etc.) of the horizontal plane. In some implementations, user device 210 may determine a size of the horizontal plane by determining multiple dimensions of the horizontal plane. In some implementations, user device 210 may determine a size of the horizontal plane based on a function of one or more dimensions of the horizontal plane. For example, user device 210 may determine a size of the horizontal plane by determining an area of the horizontal plane. As another example, user device 210 may determine a size of the horizontal plane by determining a perimeter of the horizontal plane. In this way, user device 210 may determine a size of the horizontal plane, which may enable user device 210 to determine that the size of the horizontal plane satisfies a threshold, as described herein.

As further shown in FIG. 4, process 400 may include determining that the size of the horizontal plane satisfies a threshold (block 430). For example, user device 210 may determine (e.g., using processor 320 and/or the like) that the size of the horizontal plane satisfies a threshold, as described above in connection with FIGS. 1A-1E.

In some implementations, user device 210 may determine that the size of the horizontal plane satisfies a threshold by determining that a dimension (e.g., length, width, etc.) of the horizontal plane satisfies a threshold. For example, user device 210 may determine that the size of the horizontal plane satisfies a threshold by determining that a particular dimension (e.g., length) satisfies a threshold. As another example, user device 210 may determine that the size of the horizontal plane satisfies a threshold by determining that any dimension (e.g., either length or width), of some or all identified dimensions, satisfies a threshold.

In some implementations, user device 210 may determine that the size of the horizontal plane satisfies a threshold by determining that multiple dimensions of the horizontal plane satisfy a threshold. For example, user device 210 may determine that the size of the horizontal plane satisfies a threshold by determining that a first dimension of the horizontal plane satisfies a first threshold and that a second dimension of the horizontal plane satisfies a second threshold. In this case, the first threshold may be the same as the second threshold, or may be different than the second threshold.

In some implementations, user device 210 may determine that the size of the horizontal plane satisfies a threshold by determining that a measurement, which is a function of one or more dimensions of the horizontal plane, satisfies a threshold. For example, user device 210 may determine that the size of the horizontal plane satisfies a threshold by determining that an area of the horizontal plane satisfies a threshold. As another example, user device 210 may determine that the size of the horizontal plane satisfies a threshold by determining that a length of a perimeter of the horizontal plane satisfies a threshold.

As a specific example, assume that user device 210 has identified a horizontal plane that is rectangular in shape, and that the horizontal plane is 3 meters in length and 3 meters in width. In this case, user device 210 may determine that the horizontal plane satisfies the threshold if the threshold requires either dimension of the horizontal plane (e.g., length or width) to be at least 3 meters. Alternatively, in this case, user device 210 may determine that the horizontal plane satisfies the threshold if the threshold requires both dimensions of the horizontal plane to be at least 3 meters. Alternatively, in this case, user device 210 may determine that the horizontal plane satisfies the threshold if the threshold requires the area of the horizontal plane to be at least 9 square meters. Alternatively, in this case, user device 210 may determine that the horizontal plane satisfies the threshold if the threshold requires the perimeter of the horizontal plane to be at least 12 meters.

In some implementations, the threshold may be user configurable. For example, user device 210 may provide a user interface via which a user can select, adjust, reset, configure, and/or reconfigure the threshold. In some implementations, user device 210 and/or augmented reality platform 225 may apply artificial intelligence or related techniques to determine the threshold. For example, user device 210 may provide a user interface by which a user can provide input to user device 210 to designate a horizontal plane as a ground plane, and user device 210 may apply machine learning to modify the threshold or other parameters that may be used to designate a horizontal plane as a ground plane. Additionally, or alternatively, user device 210 may allow the user to indicate that a horizontal plane is not a ground plane, and user device 210 may apply machine learning to modify the threshold or other parameters in a similar fashion. In some implementations, augmented reality platform 225 may apply artificial intelligence or related techniques to determine a threshold (e.g., a default threshold provided to user device 210) based on input from other user devices 210.

In this way, user device 210 may determine that the size of the horizontal plane satisfies a threshold, which may enable user device 210 to designate the horizontal plane as a ground plane, as described herein.

As further shown in FIG. 4, process 400 may include designating the horizontal plane as a ground plane based on determining that the size of the horizontal plane satisfies the threshold (block 440). For example, user device 210 may designate (e.g., using processor 320 and/or the like) the horizontal plane as a ground plane based on determining that the size of the horizontal plane satisfies the threshold, as described above in connection with FIGS. 1A-1E.

In some implementations, user device 210 may extend the horizontal plane in one or more directions based on determining that the size of the horizontal plane satisfies the threshold. In some implementations, user device 210 may prevent additional horizontal plane detection based on determining that the size of the horizontal plane satisfies the threshold.

In this way, user device 210 may designate the horizontal plane as a ground plane, which may enable user device 210 to output an indication that the horizontal plane has been designated as the ground plane, as described herein, and which may enable user device 210 to superimpose a representation of an augmented reality object on the image relative to the horizontal plane designated as the ground plane, as described herein.

As further shown in FIG. 4, process 400 may include outputting an indication that the horizontal plane has been designated as the ground plane (block 450). For example, user device 210 may output (e.g., processor 320, output component 360, and/or the like) an indication that the horizontal plane has been designated as the ground plane, as described above in connection with FIGS. 1A-1E.

In some implementations, user device 210 may present, for display, the indication that the horizontal plane has been designated as the ground plane. Additionally, or alternatively, user device 210 may output, for storage (e.g., in one or more memories of user device 210 and/or augmented reality platform 225), the indication that the ground plane has been identified and/or designated.

In this way, user device 210 may output an indication that the horizontal plane has been designated as the ground plane.

As further shown in FIG. 4, process 400 may include superimposing a representation of an augmented reality object on the image relative to the horizontal plane designated as the ground plane (block 460). For example, user device 210 may superimpose (e.g., using processor 320, output component 360 and/or the like) a representation of an augmented reality object on the image relative to the horizontal plane designated as the ground plane, as described above in connection with FIGS. 1A-1E.

In some implementations, the user device 210 may superimpose the representation of the augmented reality object on the image according to one or more techniques described in U.S. patent application Ser. No. 15/580,387 and/or U.S. patent application Ser. No. 15/850,793, which are both hereby incorporated by reference in their entirety.

In some implementations, user device 210 may superimpose the representation of an augmented reality object on the image using the horizontal plane designated as the ground plane as a reference point. For example, user device 210 may superimpose the representation of the augmented reality object to appear at a particular height relative to the horizontal plane by placing the augmented reality object a particular distance from the horizontal plane designated as a ground plane.

In some implementations, user device 210 may superimpose the representation of an augmented reality object on the image using a guide marker. For example, user device 210 may superimpose a guide marker on the image, and may determine three-dimensional (3D) coordinates of an intersection point associated with the guide marker. In this case, the intersection point may be a point where a projection of the guide marker into 3D space intersects with the horizontal plane designated as the ground plane. Continuing with the example, user device 210 may determine two-dimensional (2D) coordinates associated with presentation of an augmented reality object on the image based on the 3D coordinates of the intersection point, and superimpose a representation of the augmented reality object on the image based on the 2D coordinates. In some implementations, the guide marker may include a guide line, a guide box, and/or a bounding shape.

In some implementations, the user device 210 may superimpose the representation of the augmented reality object on the image based on performing image processing to determine a position for placement of the augmented reality object, a size of the augmented reality object, a transparency level of the augmented reality object, an orientation of the augmented reality object, and/or the like. For example, the user device 210 may place the augmented reality object in a position that does not block the target object, that does not block one or more other objects, that does not obscure detected text or images, and/or the like. In some implementations, the user device 210 may generate the augmented reality object to have a particular size and/or position such that one or more of the above constraints are not violated.

Additionally, or alternatively, the user device 210 may identify an object in the image (e.g., using a model stored and/or applied locally by user device 210 and/or a model stored and/or applied by augmented reality platform 225), and may place the augmented reality object on the object (e.g., a house, a building, a vehicle, a billboard, and/or the like). In some implementations, the user device 210 may prioritize multiple objects in the image, and may superimpose the augmented reality object on a low priority object, and/or may prevent the augmented reality object from being superimposed over a high priority object. Additionally, or alternatively, the user device 210 may determine a transparency level for the augmented reality object based on a priority of an object over which the augmented reality object is being superimposed (e.g., more transparent when placed over a high priority object, less transparent what placed over a low priority object).

Additionally, or alternatively, the user device 210 may determine an orientation of the augmented reality object based on the horizontal plane designated as the ground plane, based on the target object, based on one or more other objects in the image, and/or the like. For example, the user device 210 may orient an edge of the augmented reality object to be parallel to the ground plane, to be perpendicular to the ground plane, and/or the like. Additionally, or alternatively, the user device 210 may determine a size for the augmented reality object based on a size of the detected horizontal plane designated as the ground plane, based on the size of the target object, based on the size of one or more other objects in the image, and/or the like. For example, the user device 210 may generate the augmented reality object to match a size of an object in the image (e.g., a billboard, a side of a building, a side of a vehicle, a sign, and/or the like).

In this way, user device 210 may superimpose a representation of an augmented reality object on the image relative to the horizontal plane designated as the ground plane.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit user device 210 to identify a ground plane, which can be used as a reference plane for the placement of augmented reality objects. For example, user device 210 may identify a horizontal plane in an image being captured by a device, determine a size of the horizontal plane, and determine that the size of the horizontal plane satisfies a threshold. Based on determining that the size of the horizontal plane satisfies the threshold, user device 210 may designate the horizontal plane as a ground plane, output an indication that the horizontal plane has been designated as the ground plane, and superimpose a representation of an augmented reality object on the image relative to the horizontal plane designated as the ground plane.

In this way, user device 210 provides for effective and accurate placement of augmented reality objects in an image displayed by user device 210. Furthermore, by automatically identifying and/or designating the ground plane upon satisfaction of the threshold, user device 210 obviates further horizontal plane detection operations, thus conserving processing resources, power (e.g., battery life), and/or the like of user device 210 and/or augmented reality platform 225, and improving a user experience.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a device and based on feature points in an image, multiple horizontal planes in the image;
   estimating, by the device, a vertical distance between the device and a first horizontal plane of the multiple horizontal planes;
   eliminating, by the device, the first horizontal plane from consideration as a ground plane based on the vertical distance not satisfying a threshold;
   designating, by the device and based on eliminating the first horizontal plane from consideration as the ground plane, a second horizontal plane, of the multiple horizontal planes, as the ground plane; and
   providing, by the device and for display, an indication responsive to the second horizontal plane being designated as the ground plane.

2. The method of claim 1, wherein the vertical distance is a first vertical distance;
   wherein the method further comprises:

estimating a second vertical distance between the device and the second horizontal plane; and
wherein designating the second horizontal plane as the ground plane comprises:
designating, based on estimating the second vertical distance, the second horizontal plane as the ground plane.

3. The method of claim 2, wherein designating the second horizontal plane as the ground plane further comprises:
designating, based on the second vertical distance satisfying the threshold, the second horizontal plane as the ground plane.

4. The method of claim 1, wherein the threshold is configurable based on detecting whether a user of the device is standing or sitting.

5. The method of claim 1, further comprising:
detecting whether a user of the device is standing or sitting based on at least one of:
a movement of the device,
an acceleration of the device, or
gait detection; and
configuring the threshold based on detecting whether the user is standing or sitting.

6. The method of claim 1, further comprising:
determining an area value of a perimeter of the second horizontal plane; and
wherein designating the second horizontal plane as the ground plane comprises:
designating, based on determining the area value of the perimeter, the second horizontal plane as the ground plane.

7. The method of claim 1, further comprising:
determining a size of a perimeter of the second horizontal plane; and
wherein designating the second horizontal plane as the ground plane comprises:
designating, based on determining the size of the perimeter, the second horizontal plane as the ground plane.

8. A device, comprising:
one or more memories; and
one or more processors communicatively coupled to the one or more memories, configured to:
detect, based on feature points in an image, multiple horizontal planes in the image;
estimate a vertical distance between the device and a first horizontal plane of the multiple horizontal planes;
eliminate the first horizontal plane from consideration as a ground plane based on the vertical distance not satisfying a threshold;
designate, based on eliminating the first horizontal plane from consideration as the ground plane, a second horizontal plane, of the multiple horizontal planes, as the ground plane; and
provide, for display, an indication responsive to the second horizontal plane being designated as the ground plane.

9. The device of claim 8, wherein the vertical distance is a first vertical distance;
wherein the one or more processors are further configured to:
estimate a second vertical distance between the device and the second horizontal plane; and
wherein the one or more processors, when designating the second horizontal plane as the ground plane, are configured to:
designate, based on estimating the second vertical distance, the second horizontal plane as the ground plane.

10. The device of claim 9, wherein the one or more processors, when designating the second horizontal plane as the ground plane, are further configured to:
designate, based on the second vertical distance satisfying the threshold, the second horizontal plane as the ground plane.

11. The device of claim 8, wherein the threshold is configurable based on detecting whether a user of the device is standing or sitting.

12. The device of claim 8, wherein the one or more processors are further configured to:
detect whether a user of the device is standing or sitting based on at least one of:
a movement of the device,
an acceleration of the device, or
gait detection; and
configure the threshold based on detecting whether the user is standing or sitting.

13. The device of claim 8, wherein the one or more processors are further configured to:
determine an area value of a perimeter of the second horizontal plane; and
wherein the one or more processors, when designating the second horizontal plane as the ground plane, are configured to:
designate, based on determining the area value of the perimeter, the second horizontal plane as the ground plane.

14. The device of claim 8, wherein the one or more processors are further configured to:
determine a size of a perimeter of the second horizontal plane; and
wherein the one or more processors, when designating the second horizontal plane as the ground plane, are configured to:
designate, based on determining the size of the perimeter, the second horizontal plane as the ground plane.

15. A non-transitory computer-readable medium storing instructions, the instructions comprising:
one or more instructions that, when executed by one or more processors of a device, cause the one or more processors to:
detect, based on feature points in an image, multiple horizontal planes in the image;
estimate a vertical distance between the device and a first horizontal plane of the multiple horizontal planes;
eliminate the first horizontal plane from consideration as a ground plane based on the vertical distance not satisfying a threshold;
designate, based on eliminating the first horizontal plane from consideration as the ground plane, a second horizontal plane, of the multiple horizontal planes, as the ground plane; and
provide, for display, an indication responsive to the second horizontal plane being designated as the ground plane.

16. The non-transitory computer-readable medium of claim 15, wherein the vertical distance is a first vertical distance;
wherein the one or more instructions, when executed by the one or more processors, cause the one or more processors to:

estimate a second vertical distance between the device and the second horizontal plane; and wherein the one or more instructions, that cause the one or more processors to designate the second horizontal plane as the ground plane, cause the one or more processors to:

designate, based on estimating the second vertical distance, the second horizontal plane as the ground plane.

17. The non-transitory computer-readable medium of claim 16, wherein the one or more instructions, that cause the one or more processors to designate the second horizontal plane as the ground plane further, cause the one or more processors to:

designate, based on the second vertical distance satisfying the threshold, the second horizontal plane as the ground plane.

18. The non-transitory computer-readable medium of claim 15, wherein the threshold is configurable based on detecting whether a user of the device is standing or sitting.

19. The non-transitory computer-readable medium of claim 15, wherein the one or more instructions, when executed by the one or more processors, further cause the one or more processors to:

detect whether a user of the device is standing or sitting based on at least one of:

a movement of the device, an acceleration of the device, or gait detection; and configure the threshold based on detecting whether the user is standing or sitting.

20. The non-transitory computer-readable medium of claim 15, wherein the one or more instructions, when executed by the one or more processors, further cause the one or more processors to:

determine an area value of a perimeter of the second horizontal plane; and wherein the one or more instructions, that cause the one or more processors to designate the second horizontal plane as the ground plane, cause the one or more processors to:

designate, based on determining the area value of the perimeter, the second horizontal plane as the ground plane.

* * * * *